US008304041B2

(12) United States Patent
Johnson (10) Patent No.: US 8,304,041 B2
(45) Date of Patent: *Nov. 6, 2012

(54) METHODS AND APPARATUS FOR PROPER INSTALLATION AND ORIENTATION OF ARTIFICIAL EYE OR EYEPIECE INSERT ONTO A TAXIDERMY MANNEQUIN OR LIFE-LIKE SCULPTURE

(76) Inventor: Brian L. Johnson, Hayward, WI (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/006,040

(22) Filed: Jan. 13, 2011

(65) Prior Publication Data
US 2011/0104402 A1 May 5, 2011

Related U.S. Application Data (63) Continuation of application No. 11/352,055, filed on Feb. 10, 2006, now Pat. No. 7,892,067.

(51) Int. Cl.
*A63H 3/38* (2006.01)
(52) U.S. Cl. ............................................. 428/16; 29/428
(58) Field of Classification Search .................... 428/16; 29/428
See application file for complete search history.

(56) References Cited

U.S. PATENT DOCUMENTS

| 1,704,829 A | 3/1929 | Grubman |
| 2,675,561 A | 4/1954 | Clarke |
| 2,763,031 A | 9/1956 | Rekettye |
| 2,820,325 A | 1/1958 | Prupis |
| 3,101,993 A | 8/1963 | Cohn |
| 3,106,040 A | 10/1963 | Ostrander |
| 3,124,842 A | 3/1964 | Moormann |
| 3,160,691 A | 12/1964 | Chupa |
| 3,889,918 A | 6/1975 | Stoeberl |
| 4,157,805 A | 6/1979 | Haber et al. |
| 4,432,919 A | 2/1984 | Rinehart |
| 4,477,500 A | 10/1984 | Powell |
| 4,511,522 A | 4/1985 | Rinehart |
| 4,515,340 A | 5/1985 | Rinehart |
| 4,596,683 A | 6/1986 | Powell |
| 4,642,209 A | 2/1987 | Powell |
| 4,650,149 A | 3/1987 | Poulette et al. |
| 4,705,488 A | 11/1987 | Bohl, Jr. et al. |
| 4,753,412 A | 6/1988 | Johnson |
| 4,775,323 A | 10/1988 | Johnson |
| 4,822,397 A * | 4/1989 | Crossley ........................ 65/107 |
| 5,058,293 A | 10/1991 | Villar |
| 5,645,780 A | 7/1997 | Rinehart |
| 5,735,895 A | 4/1998 | Rinehart |
| 6,007,881 A | 12/1999 | Lennard |
| 6,099,379 A * | 8/2000 | Eppley ........................ 446/392 |

(Continued)

OTHER PUBLICATIONS

Requirement for Restriction/Election for U.S. Appl. No. 11/352,055, mailed Jul. 1, 2008.

(Continued)

*Primary Examiner* — Michael Dennis
(74) *Attorney, Agent, or Firm* — K&L Gates LLP (57) ABSTRACT

A method of positioning an eye of a taxidermy animal head or sculpture comprises applying removable visible indicia to an external front surface of the eye and aligning the visible indicia.

10 Claims, 5 Drawing Sheets

U.S. PATENT DOCUMENTS

| | | |
|---|---|---|
| 6,500,045 B1 | 12/2002 | Secrist |
| 6,811,461 B2 | 11/2004 | Maddocks et al. |
| 6,923,654 B2 | 8/2005 | Johnson |
| 6,993,970 B2 | 2/2006 | Weiss et al. |
| 7,371,069 B2 | 5/2008 | Johnson |
| 7,892,067 B2 | 2/2011 | Johnson |

OTHER PUBLICATIONS

Non-Final Rejection for U.S. Appl. No. 11/352,055, mailed Oct. 6, 2008.
Final Rejection for U.S. Appl. No. 11/352,055, mailed Mar. 20, 2009.
Non-Final Rejection for U.S. Appl. No. 11/352,055, mailed Jul. 14, 2009.
Final Rejection for U.S. Appl. No. 11/352,055, mailed Feb. 22, 2010.
Non-Final Rejection for U.S. Appl. No. 11/352,055, mailed Jul. 1, 2010.
Notice of Allowance for U.S. Appl. No. 11/352,055, mailed Oct. 12, 2010.

* cited by examiner

METHODS AND APPARATUS FOR PROPER INSTALLATION AND ORIENTATION OF ARTIFICIAL EYE OR EYEPIECE INSERT ONTO A TAXIDERMY MANNEQUIN OR LIFE-LIKE SCULPTURE

CROSS-REFERENCE TO RELATED APPLICATIONS

This non-provisional patent application is a continuation patent application of and claims the benefit from U.S. patent application Ser. No. 11/352,055, filed Feb. 10, 2006, entitled "Methods and Apparatus For Proper Installation and Orientation of Artificial Eye or Eyepiece Insert Onto a Taxidermy Mannequin or Life-Like Sculpture, U.S. Patent Publication No. US 2007/0190510 A1, the entire disclosure of which is herein incorporated by reference.

BACKGROUND OF THE INVENTION

When a taxidermist or artist wants to artificially recreate anatomical features, typically the hardest "feature" to recreate correctly are the eyes. The eyes give "life" to a re-creation so the correct eye look is paramount if the re-creation is to "look alive". Specifically, the artificial eyes must be correctly oriented in the eye sockets of the sculpture. Generally, the first step in orientation is leveling both opposing eye pupils with each other. This is difficult because both eyes must be symmetrical with each other. Many eyes have very dark irises or are entirely very dark, so that the pupils are only slightly darker than their surroundings and can be seen only in perfect lighting. This makes it very difficult to "level" both eye pupils with each other. As a result of this difficulty, some in the artificial eye business make very dark eyes with no pupils so as to avoid a possible misalignment. This, of course, is anatomically incorrect, thus not an option for a realistic eye recreation.

Some animals, for example, a fox, have vertical slit pupils, whereas other animals, for example, a deer, have horizontal pupils and other animals, for example, a bear, have round pupils. Where the pupil is not perfectly circular, the orientation of the pupil is important to a realistic appearance for several reasons. First, the eyes of different animals are naturally set at different angles with regard to the "straight ahead" direction. For example, a dog's eyes are at almost 0° to straight ahead, whereas some bird species have their eyes at almost 90° to straight ahead. A white-tailed deer's eyes are at approximately 45° to straight ahead. Moreover, there are variations in shape and size even for different sized animals of the same species.

Secondly, most taxidermy mannequins and other forms have sockets that are incorporated to give this angle. In addition, the eyes of many animals move in cooperation, so that the two eyes appear to be looking in the same direction, or converging slightly if the animal is focused on a nearby object. As a result, when a mounted animal appears to be looking straight ahead, the artificial eyes can be pre-manufactured with the pupil aligned inward from the center of the eye by an angle equal to the angle by which the eye is outward from straight ahead. However, it is common that the opposing sockets in the form not the same angle, or are not at the angle expected when the eye was prepared by the manufacturer or artist, thus giving the finished mounted eyes the appearance of looking in different directions from each other, or a "cross-eyed" look.

The third significant orientation is vertical. On most mounts, e.g., a typical pronghorn antelope, the eyes are arranged with an orientation that appears to focus parallel with the ground. Other mounts, e.g., a typical Bighorn sheep, the eyes are arranged with an orientation that is at a 6° angle downward slant. White-tailed deer may be mounted so that the eyes are either horizontal or appear to focus with a 6° downward slant.

Besides orienting the eyes in a anatomically correct orientation and symmetrically with each other, artificial eyelids need to be realistically recreated. This is generally done by placing clay or epoxy onto the artificial eye and onto the surrounding material of a form or mannequin to recreate the eyelids, both upper and lower. Certain animals, e.g., a deer, have rounded large eye openings, whereas a human can have very little exposed eye with slanting corners. Some animals, e.g., a rabbit, have their eyelids equally spaced above and below the pupils, so that the pupil is in the middle of the eye when the eyelids are correctly placed upon the glass eye. On other animals, e.g., a wolf, their pupils are located above the center of the eye, meaning that the upper eyelid comes down closer to the pupil, whereas the lower eyelid is farther away from the pupil as compared with the upper lid.

To appear realistic, the eyelids must also be correctly positioned above and below each pupil, the opposing eyelids should in general leave the same amount of exposed eye surface visible in each opposing eye and placed in the same orientation. If one eye is more open than the other, the look will be as if the animal has one eye squinting, as if it is squinting into the sun, thus giving the mounted animal an unnatural or inappropriate appearance. If one eye squints in a live animal, the other would usually squint as well. The only common situation where just one eye squints is where the sun is shining on only one eye, and sculptures are seldom displayed under such uneven lighting conditions.

It is also usually desirable when re-creating eyelids to have opposing eyelids equally distanced from the pupils. Even though the eyes are equal in separation between the upper and lower eyelids, the eyelids of the two eyes may be unequally distanced from the pupils, so that the eyelids are lower on one eye than the other. The finished eye can then look as if the pupils are not centered evenly with each other, giving a look of one eye looking down and the other looking up.

Conventionally, the taxidermist, to accomplish correct orientation of an artificial eye, must either "wing it" by his/her artistic judgment or capability, or use time exhausting tools, such as a protractor, level, calipers and tape measure, to try to achieve uniform orientations and placements. This still leaves the quality and the appearance of the final product to the artistic ability of the craftsman, regardless of how much time is spent in placement of the eyes and lids.

U.S. Pat. No. 4,432,919 (Rinehart) describes a molded animal head for a taxidermy mannequin in which an eye socket is provided with molded indicia on which the pupil of an artificial eye can be aligned. However, Rinehart's indicia are effective only if the pupil of the eye is exactly centered on the molded socket, and are difficult to use on a dark eye when the pupil is difficult to see or cannot be easily seen. Moreover, Rinehart's indicia fail to assist in placing the angled eye or in positioning the eyelids.

U.S. Pat. No. 6,923,654 (Johnson) describes an artificial eye mount for a sculptured form, comprising at least an artificial eye component and a molded eye mounting area mated thereto in correct orientation, wherein the back side (or inside) of the artificial eye is configured to facilitate mechanically correct installation within the molded eye mounting area of the sculptured form. However, molded features of the eye socket area cannot be removed after placement, and thus, undesirably must become part of the final mount. As a result, index lines cannot be removed from the '654 invention to achieve proper orientation or placement of the eyepiece, and as mentioned with the '919 invention, no provision is made to assist in positioning the eyelids.

There is therefore a hitherto unfilled need for a method and apparatus by which the eyes and eyelids of an animal head for a taxidermy mount or other sculpted forms, that can be easily and accurately positioned, permitting the use of commercially formed eyes, and that eliminates or materially reduces the disadvantages of the prior art.

SUMMARY OF THE INVENTION

Accordingly, the present invention is directed to artificial eyes, apparatus for preparing such eyes, and methods of aligning such eyes, that substantially obviate one or more of the problems due to limitations and disadvantages of the related art.

An object of one embodiment of the present invention is to provide a method of positioning an eye of a taxidermy animal head form, comprising applying removable visible indicia to an external front surface of the eye and aligning the visible indicia.

An object of another embodiment of the present invention is to provide an artificial eye for a taxidermy animal head form, comprising removable visible indicia on an external front surface of the eye, which indicia comprise indicia suitable for aligning the eye by aligning the visible indicia.

An object of another embodiment of the present invention is to provide an apparatus for applying indicia to an artificial eye, comprising an eye cover shaped to fit over the front outer surface of the eye and having apertures in the eye cover through which removable ink or paint can be applied to the eye at positions determined by the positions of the apertures.

An object of another embodiment of the present invention is to provide an apparatus for applying indicia to an artificial eye, comprising a contour printing pad formed to apply removable ink or paint to the eye at desired positions.

Additional features, objects and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiment of the present invention, example of which is illustrated in the accompanying drawings. Like elements have the same numbers throughout the several views, for example, with reference to artificial eyepiece 10 on the taxidermy mannequin. The detailed description accompanying each Figure is not intended to limit the scope of the claims appended hereto.

Figure 1:
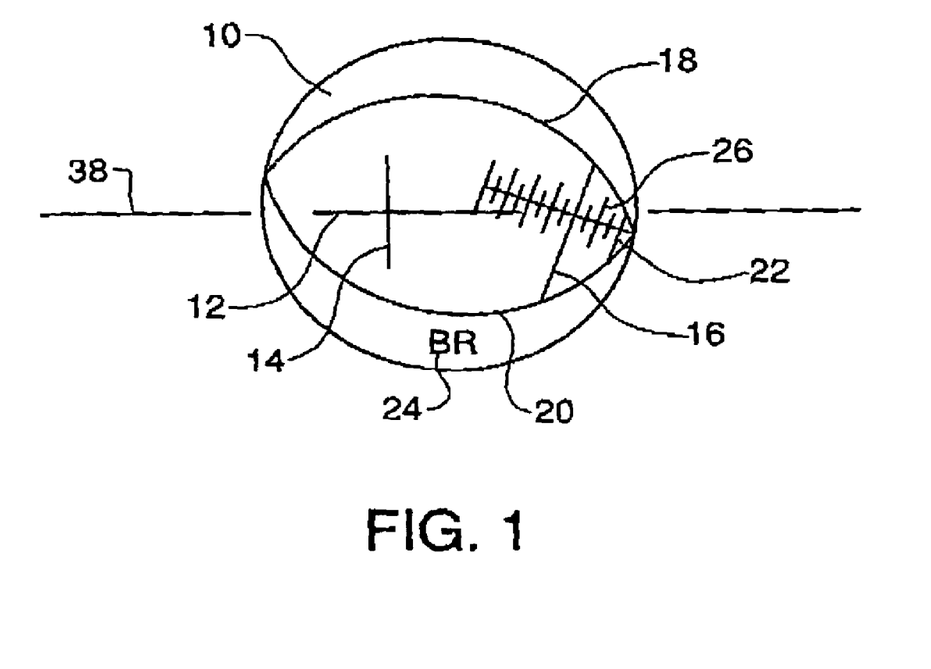
FIG. 1 is a front view of an artificial eye marked with indicia in accordance with an embodiment of the invention.

Referring initially to FIG. 1, an artificial eye 10 is of any size, shape or material with no limitation. By way of example, artificial eye 10 is a commercially available, manufactured artificial eye in the form of a solid dome or hollow shell of glass or other material with a smooth exterior, having the appearance of an animal's eye painted on the inside or molded into the glass, in a manner well recognized in the taxidermy and sculpture arts or by practitioners familiar with artificial or glass eyes. The eye 10 is hemispheric, or may be less than a hemisphere, for example, the eye 10 may be a shell forming approximately ⅓ of the diameter of a sphere. The painted or molded image of the eye may be sufficiently translucent that the pupil is clearly seen from the front, when a bright light is placed behind the eye, even in the case of an eye that is dark or has a dark iris surrounding the pupil. The artificial eye of the present invention is also one that is formed by the taxidermist or artist, so long as a pair of matched and mated eyes are sufficiently uniform as to permit use by the present methods.

Index lines are removably applied to artificial eye 10 as shown in FIG. 1. A pupil horizontal axis line 12 is aligned along the horizontal axis of the pupil. In the case of an eye having a slit pupil, the orientation of pupil horizontal axis line 12 is important to ensure the slit pupil is correctly oriented. In the case of an eye having a round pupil, the pupil horizontal axis line 12 is placed on any line through the center of the pupil, or a round dot is placed directly over the center of the round pupil. A pupil forward tilt axis line 14 intersects the pupil horizontal axis line 12 at a right angle. For a species with forward-facing eyes, axis lines 12 and 14 intersect at the center of the pupil. Alternatively, a round dot is placed directly over the center of a round pupil. For a species with sideways-facing eyes, such as a bird, the forward tilt axis line 14 usually is offset forward from the center of the pupil. An eye-cant line 16 is positioned at the inner corner of eye 10.

An upper eyelid line 18 and a lower eyelid line 20 are also provided, as shown. In the interests of clarity, the eyelid lines 18 and 20 are shown in FIG. 1 as continuous lines extending entirely across artificial eye 10. However, in a practical embodiment in which the "indicia" (as shown by lines 12, 14, 16, 18, 20, etc.) are applied by a stencil to the outer, forward surface of the glass eye, lines 16, 18, 20 may be shorter or interrupted, in order to preserve the integrity of the stencil. Additional removable lines or images may be further added to the outer surface of the artificial eye in certain embodiments, and such addition, although not shown in the Figures attached hereto, are encompassed by the present invention.

The indicia 12, etc. are made easily visible, for example, by applying the indicia in a white or light-colored material that contrasts with a dark eye 10, by applying the indicia in a dark material that contrasts with a light-colored eye 10, or by applying the indicia in a bright color that contrasts with the eye 10. A positioning line 22 for attaching a nictitating membrane may also be provided, if appropriate for the species of animal, such as a bird, that eye 10 is used to recreation.

Lettering 24 may be provided in the areas outside the eyelid lines 18, 20. Since the lettering, like the other indicia, is removable from the exterior surface of the eye in the final mount, the lettering will not be seen when the mount is complete and will not interfere with the alignment indicia. For example, the letters "BR" are shown in FIG. 1, identifying the Bottom of the eye 10, and the fact that it is a Right eye. Depth scales 26 may also be provided at the front of each eye.

For a typical animal mount, eye 10, as shown in FIG. 1, which is a right eye, and a mirror-symmetrical left eye (not shown) are positioned loosely on a mannequin. The present mannequin includes any life-like and realistic sculptures, e.g., taxidermy mounts (built upon underlying mannequin sculptures), clothing mannequins, dolls, artistic sculptures, etc., such as the mannequin shown in U.S. Pat. No. 4,775,323, which is incorporated herein by reference in its entirety. For example, eye 10 may be attached using soft clay or epoxy that allows easy adjustment of the alignment of the eye at first, but slowly sets hard to fix the eye in place. Or, the eye may be on a mechanical mount that can be tightened to lock the eye in place. In use, eye 10 is turned so that the pupil horizontal axis lines 12 of the two mated eyes are level and even on the sculpture.

Then, while looking straight at the middle of the mannequin each eye is turned so that pupil forward tilt axis line 14 is visible equally on both eyes. The alignment of eye 10 includes adjusted by packing additional clay or other material under one edge of the eye. For an animal with forward-facing eyes that uses binocular vision, the axis lines 14 is positioned so that the forward tilt axis lines 14 appear to be centered on eyes 10 when the taxidermist is looking from the direction towards which the mounted animal appears to be gazing. For an animal with sideways-facing eyes, the axis lines 14 are positioned symmetrically in the visible part of the eyes 10 when the taxidermist is looking from the front of the mounted animal. For example, forward tilt axis lines 14 are positioned so that they are just visible on the outermost part of eyes 10. One skilled in the art will understand such positioning.

Figure 2:
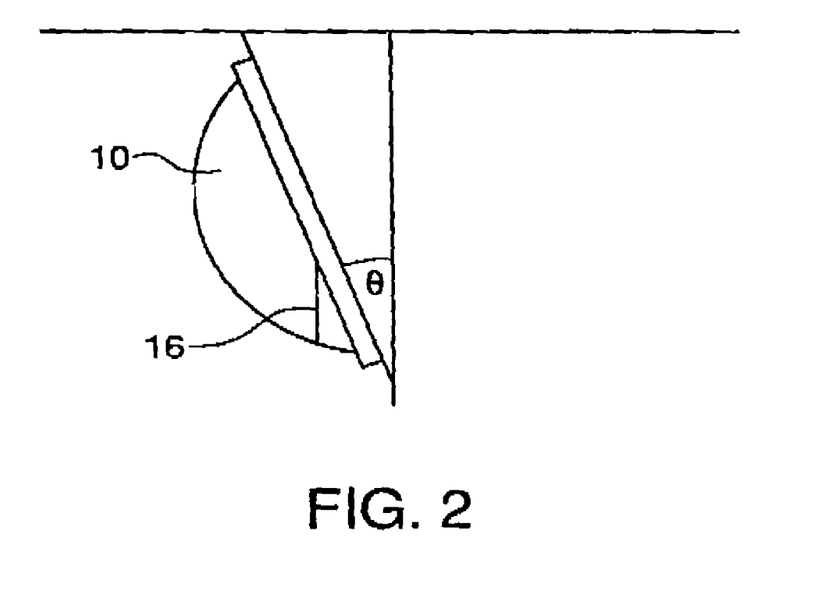
FIG. 2 is a diagram of a stage in an embodiment of a process of aligning the eye shown in FIG. 1.

The eyes 10 are first roughly aligned, in part simply by ensuring that indicia 12, 14 appear straight and symmetrical as seen from a viewpoint in front of the mannequin, as would be the accustomed practice of a craftsman skilled in taxidermy artistry. The actual alignment can be done by the practitioner using both hands, without leaving the observing position in front of the mannequin. The process of setting the eye positions is, thus, accelerated, as well as made more accurate more symmetrical, and easier for a less skilled person to accomplish. Next, each eye 10 is tilted downward as shown in FIG. 2, so that eye-cant line 16 is vertical. The angle θ by which eye 10 is tilted is determined by the positioning of eye-cant line 16. In the interests of clarity, the eye socket is not shown in FIG. 2, but imaginary vertical and horizontal reference lines are shown.

Finally, the taxidermist checks depth gauge scales 26 against the front rims of the eye sockets, to ensure that both rims are at the same positions on scales 26. Because taxidermy forms are commonly hand sculpted, or molded from hand sculpted originals, the depth of the eye sockets may vary from form to form, or even between the two eyes of a form. In addition, the eye sockets are frequently flat-bottomed. To allow for tilting of eyes 10 relative to the sockets, as is described below, the eye sockets are made relatively deep, and eyes 10 are then embedded in a layer of clay or other malleable material. If the taxidermist does not apply the correct thickness of clay, eye 10 may appear sunken or protruding. It is difficult for the taxidermist to judge the correct setting, because the rims of eyes 10 are hidden below the rims of the sockets, typically by about ⅜" (1 cm) for a large mammal, depending on the position of the eye. Scales 26 enable the taxidermist to read off the distance the front edge of the rim of eye 10 is sunken below the inside corner of the eye socket, and ensure that the two eyes 10 are even. The taxidermist would also check that the rims are at a specific position on scales 26. However, to achieve a natural appearance of the finished mount, it is usually more important that the two eyes be even and properly focused than that the two eyes are at an exact level.

As a result, both eyes 10 are now correctly oriented in their respective sockets and symmetrically balanced in all areas in orientation with the horizon and with each other. The correct orientation of eyes 10 is, therefore, defined by the position of external, removable indicia lines 12, 14, 16. The taxidermist would select different positions of the indicia in order to produce different positions of the eyes 10, but the point is that such selection is now readily implemented by using the indicia lines. The mounting of each eye 10 is then fixed or allowed to harden.

Following fixation of the eye 10 in the mounted eye socket, the eyelid material is then applied to eyelid lines 18 and 20, creating the upper and lower eyelids. Recognized practices in the art utilize, for example, clay, epoxy or similar "modeling" or malleable compounds to form the eyelids of a taxidermy mount or sculpture. If the sculpted animal normally has a nictitating membrane, such a membrane is artificially attached over guide line 22. However, certain other embodiments may dispense with eyelids altogether, as desired.

After the eyelids are complete, any exposed parts of the indicia 12, 14, 16, 18, 20, 22, 24 are removed. Of course, part or all of eyelid lines 18, 20 may be covered over by the eyelids in the end-product, and since those parts remain in place in the finished sculpture those lines that are no longer visible, need not be removed.

In preferred embodiments of the invention, the artificial eyes are made of glass, although acrylic or other transparent materials known in the art to produce life-like artificial eyes are used. Additionally, the preferred mannequin embodiments and eye mounting piece embodiments are "molded," i.e., constructed or fabricated in mold to create the body shape, including the eye mounting area and eye-surrounding features characteristic of the animal being sculpted. The mannequins, eye mounting area and eye-surrounding features are usually made of polyurethane foam or other moldable and easily carved or shaped material known in the art for producing conventional mannequins for taxidermy and other purposes. Additionally, it should be noted that various embodiments are used in a variety of types of sculptures, such as artistic sculptures, dolls, toys, etc., with appropriate materials, as are known in the art or which may be later discovered, will be enhanced by the use of the artificial eye embodiments of the present invention, and are encompassed herein. Other materials may be used as well so long as the necessary shapes can be molded, and providing that the appropriate recesses can be formed therein for insertion of the eyes of the present invention.

The entire mannequin, including the eye mounting area and eye-surrounding features, for the present invention may be molded and produced as a single piece. Alternatively the body of the mannequin may be molded as a conventional piece, then the molded eye mounting area and eye-surrounding features as disclosed in the present invention may be subsequently added to the molded mannequin body, to provide the area to which the artificial eye embodiments are then affixed.

Figure 3:
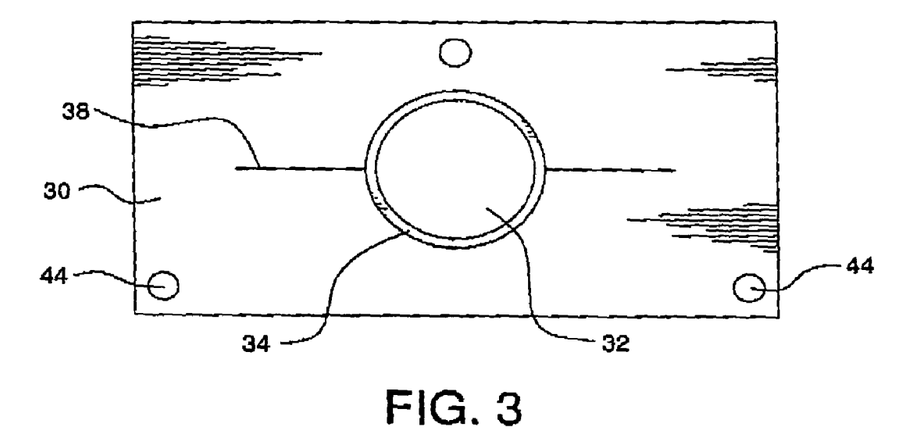
FIG. 3 is a plan view of a base part of an apparatus for accurately marking an artificial eye with indicia in accordance with an embodiment of the invention.

Referring to FIGS. 2 to 5, one embodiment of the apparatus of the present invention for applying the indicia shown in FIG. 1 comprises a base 30, as shown in FIGS. 2 and 3. Base 30 has a central hole 32, surrounded by a recess 34 in which the eye 10 seats to hold the eye in exact position. Eye 10, shown in FIG. 3, is a minor segment of a sphere, with a flat, circular rim 36, so that a recess 34 is also flat and circular. For an eye 10 having another shape, a correspondingly shaped recess 34, and a correspondingly shaped base 30 in which recess 34 is formed, is provided.

Base 30 has an alignment groove 38, also shown symbolically in FIG. 1, cut into the base, and aligned with pupil 40 of eye 10 on both sides of pupil 40. Alignment groove 38 may be continued across hole 32, directly beneath pupil 40, in the form of a bar or wire. Artificial light from a light source 42, in or below hole 32, is then shone through artificial eye 10 from the rear or inside surface with the light directed toward the individual or device that is viewing the light. In other words sequentially eye 10 is placed between the light source and the viewer, so that the hole is visible to the viewer by the light shining through it. Even dark-colored paint on the inner surface of the eye or solid dark colored glass is typically slightly translucent to light. As a result, the light from light source 42 lightens the appearance of the dark eye or artificial iris, so that pupil 40, which is darker, becomes clearly visible. The eye is then accurately rotated so that pupil 40 is in a straight line with the alignment groove 38.

In the case of a slit pupil 40, the alignment groove 38 is positioned to lie along the pupil. In the case of a round pupil 40 offset from the center of the eye 10, the alignment groove 38 lies along the direction in which the pupil is to be offset. In the case of a round pupil at the center of the eye 10, the alignment groove 38 may be omitted. The positioning of eye 10 on the base 30, assisted by the light source 42, is the only stage at which the taxidermist needs to be able to clearly see pupil 40. Further, this alignment stage may be carried out on a workbench at the position most convenient for the taxidermist or sculptor, which is typically for easier than carrying out a similar alignment on the mannequin.

In one preferred embodiment, base 30 is further provided with keys 44. As shown in FIGS. 2 and 3, keys 44 are pins 52 projecting from base 30.

Figure 4:
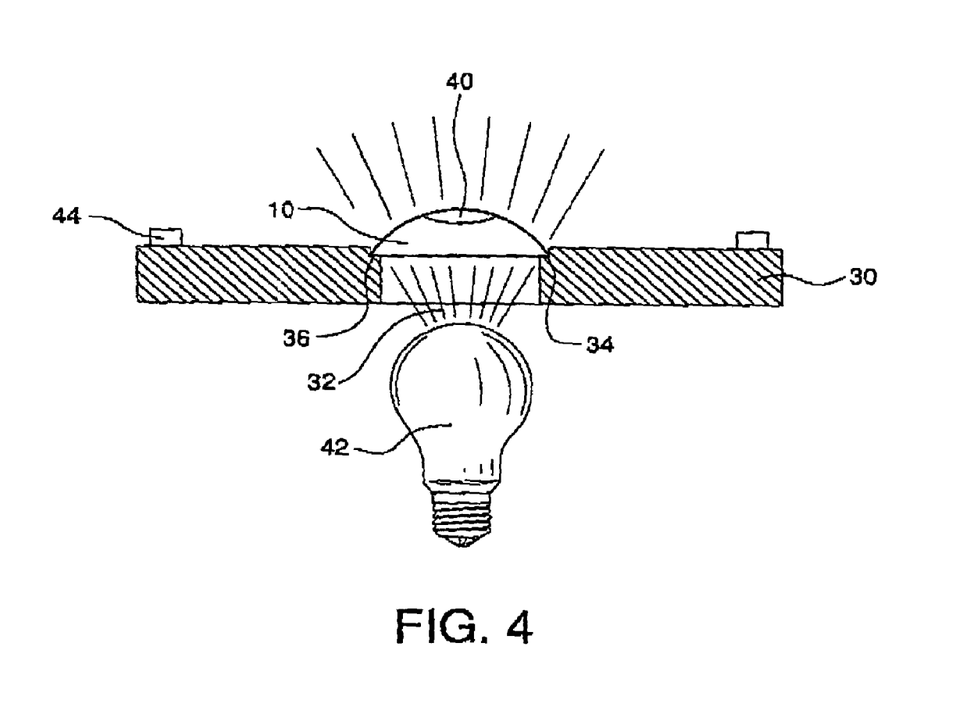
FIG. 4 is a side view of the base part shown in FIG. 3.
Figure 5:
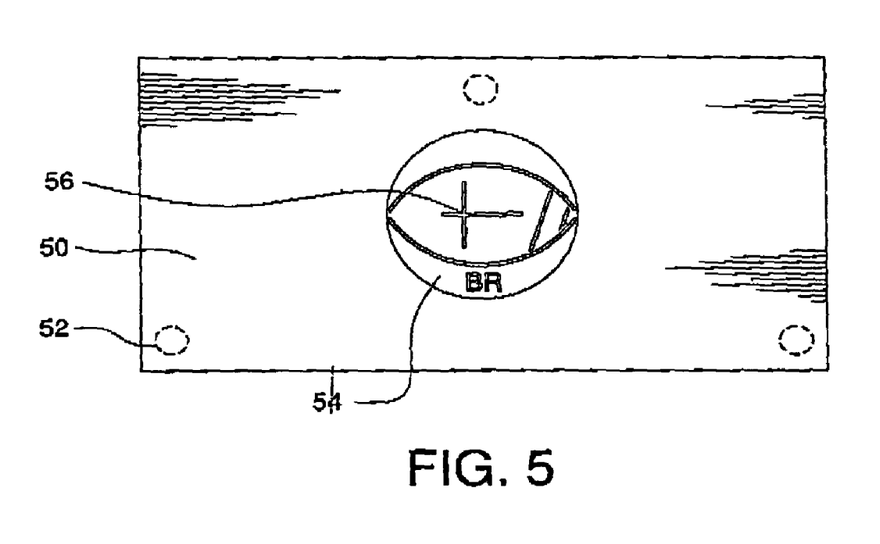
FIG. 5 is a plan view of an upper fixture of an apparatus for accurately marking an artificial eye with indicia in accordance with an embodiment of the invention.
Figure 6:
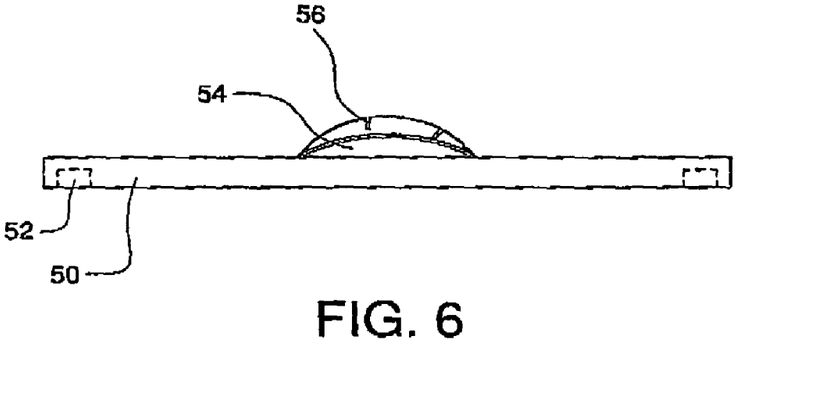
FIG. 6 is a side view of the upper fixture shown in FIG. 5.

Referring to FIGS. 4 and 5, a top fixture 50 is placed over base 30 and eye 10. The top fixture 50 is provided with keys 44, which in the embodiment shown in FIGS. 4 and 5 are sockets 52 mating with the pegs 44 to ensure that top fixture 50 aligns correctly with base 30. Moreover, by this method top fixture 50 remains correctly aligned with base 30, even if the mounting surface is moved.

Top fixture 50 has an eye cover 54 in the form of a dome that, when top fixture 50 is mounted onto base 30, fits snugly over artificial eye 10. Dome 54 has lines formed by slots or holes 56 cut out through the dome. Holes or slots 56 are then aligned over artificial eye 10, in a pattern corresponding to the indicia shown in FIG. 1. Holes or slots 56 are aligned relative to alignment groove 38 by virtue of keys 44, 52 aligning top fixture 50 on base 30. Thus, so long as pupil 40 of eye 10 is correctly aligned with alignment groove 38, the positioning of the indicia 12, etc. relative to pupil 40 is controlled entirely by the design of the apparatus 30, 50. This is accomplished primarily by the positioning of holes or slots 56 within dome 54.

Figure 4A:
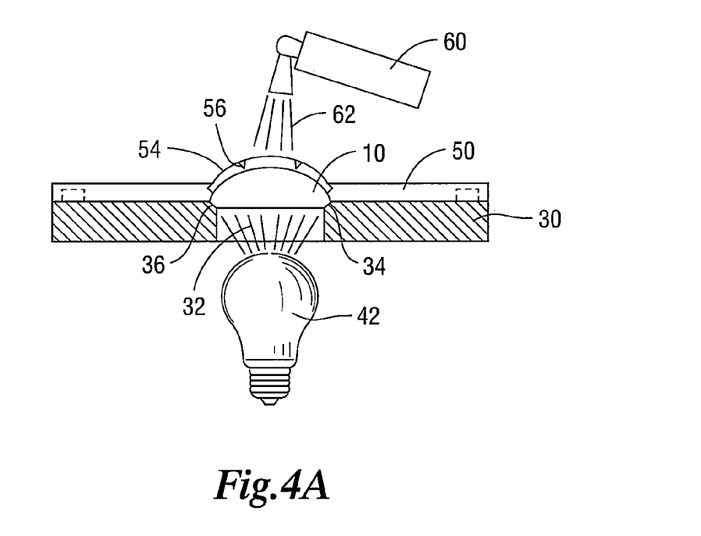
FIG. 4A is a partial cross-sectional view showing the application of paint or ink to an eye positioned between a base and upper fixture of an embodiment of the present invention.

To cause the glass or material of the artificial eye to look like an eye, it may be molded from one or more layers of colored glass, representing the pupil, iris, etc., and the indicia are then removably added externally to the front surface of such eye. In an alternative embodiment, the inner surface of the eye is painted with the colors of the pupil, iris, etc. In yet another alternative, a combination of colored glass and painted inner surface is used to create a life-like artificial eye. In any of the above embodiments, however, by the present invention ink, paint 62 (or other selected material for the indicia) is sprayed or otherwise applied by an applicator 60 through holes or slots 56 of dome 54 onto artificial eye 10, thus removably forming indicia 12 through 24 on the outer surface of eye 10. See FIG. 4A.

The term "ink" or "paint" is used herein, but it generically refers to and encompasses "ink and/or paint," as well as mastic, White-out™, certain glues, stains, powder coatings, finishes, or other dryable fluids or solids that remain removable without harming the surface of the eye, but which are visible on the outer surface of the artificial eye 10. Similarly the term "paint" is used as a verb to describe a process for applying the ink, paint, etc. to the surface of the eye, but the term is intended as it is used herein to encompass painting, inking, printing, drawing, stenciling, stamping and other means which are useful for this process, as would be recognized by one skilled in the art. In a preferred embodiment, as will be disclosed in greater detail, an ink is applied to the eye by a stamping process. Thus, "painting" is used generically, but expressly includes inking, printing, including pad printing, stamping, and the like.

The ink or paint used is specifically selected so that it dries quickly, adheres to artificial eye 10 while the eye is being positioned and the eyelids are being formed, but it is also easily and completely removed from exterior surface of eye 10 with a solvent that does not damage the exterior of the eye, the mannequin, or the material from which the eyelids are formed. In one embodiment, lacquer is used as the paint and lacquer thinner is used as the solvent.

The color of ink or paint is chosen to contrast with eye 10, so that the external painted guidelines and markings are easily visible during placement and orientation of the eyes and eyelids. When top fixture 50 is removed from base 30, eye 10 is also removed from base 30. Eye 10 then has the indicia 12 through 26 formed in ink or paint on the front outside (exterior) surface of the eye. It is important to understand that the indicia of the present invention are placed only on the outer surface of the artificial eye so that they can be completely removed after the eye has been properly fixed and the indicia are no longer needed—which removal is not possible for any indicia that may be drawn, painted or molded within eye 10, or on the inner surface of eye 10, once it is fixed in place on the mount.

The eye is then mounted and positioned on the mannequin as described above with reference to FIG. 1.

Figure 4B:
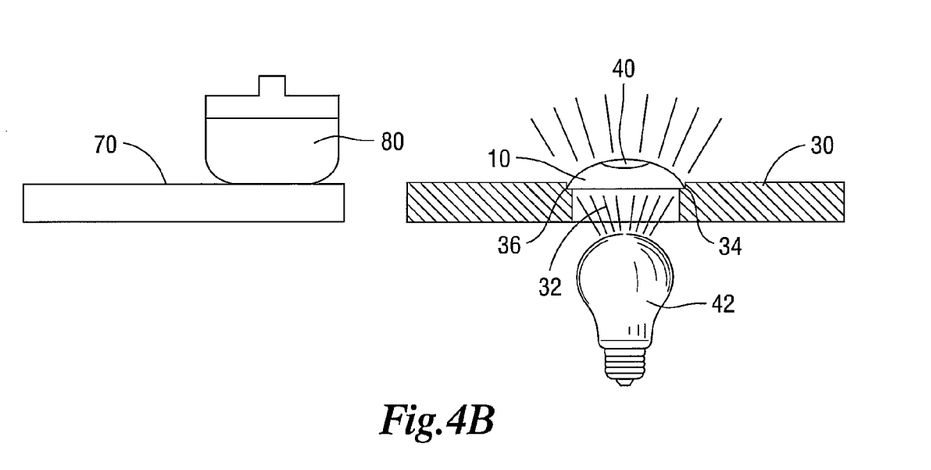
FIG. 4B is another partial cross-sectional view showing an eye mounted on a base adjacent a master and printing applicator of another embodiment of the present invention.
Figure 4C:
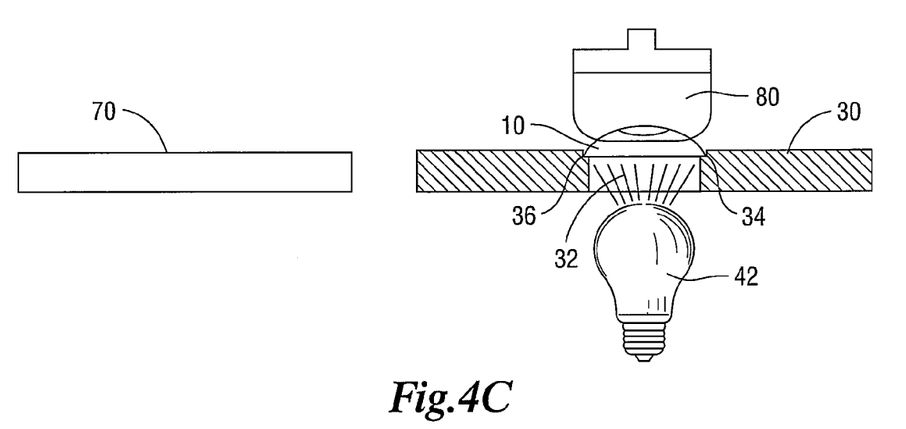
FIG. 4C is another partial cross-sectional view of the base and master arrangement depicted in FIG. 4B with the applicator in an application position in contact with the outer surface of the eye mounted on the base.

In an alternative embodiment of the invention, indicia 12 through 26 are applied to eye 10 by a pad printing process as illustrated in FIGS. 4B and 4C. Pad printing is an offset printing process in which an image is transferred from a master 70, most commonly an etched or engraved plate, to a substrate (e.g., eye 10) using a soft pad 80 that can be formed around a substrate that is not flat. See, for example, the demonstration of pad printing onto a hemispherical object at the www website "printinginternational.be/images/files/Printcycle.avi." Pad printing is a process well understood by those in the relevant art, and in the interests of conciseness will not be further described. Most of the substances encompassed within the term "paint" as defined herein are also used in pad printing. Those skilled in the pad printing art will understand how to select suitable paints. As with the process described above with reference to FIGS. 2 to 5, eye 10 is usually to aligned in a correct rotational orientation for printing, but all other orientation is effected by positioning and orienting indicia on the engraved plate or other printing master. Eye 10 is, thus, aligned for printing by appropriate techniques, in a manner similar to those described above with reference to FIGS. 2 to 5.

It will be apparent to those skilled in the art that various modifications and variations can be made without departing from the spirit or scope of the invention. For example, any surface forming material that can be properly applied to the outside of the eye and can exactly reproduce the desired indicia, are suitable for use in the present invention, and are encompassed herein. For example, one or more water-soluble or solvent-soluble or peelable decal(s), pre-printed with the indicia, together or in combination, is encompassed by the present invention, as are stencils with the necessary patterns, so long as their removal does not damage the surface of the artificial eye, eyelids or surrounding mount area.

In the interests of simplicity a single artificial eye 10 and apparatus 30, 50 for applying the indicia to a single eye have been described. However, almost every mount or sculpture would, like the animals they represent, have two eyes, and it is the simple and accurate coordinated orientation between the mated eyes that is a particular advantage of the present invention. Consequently, apparatus 30, 50 would have two recesses 34 and two domes 54 to mark a matched pair of eyes with indicia in a single operation. In fact, for the standard pose of commonly-mounted animals, e.g., in many parts of the US heads of white-tailed deer, an apparatus 30, 50 that can mark two eyes 10, or multiple sets of eyes 10 in a single operation are advantageously provided by the present invention.

The holes or slots 56 may be cut in domes 54 by computer controlled laser machining or other automated processes. A standard function in many computer controlled machining systems allows two workpieces that are mirror images of one another to be generated automatically. It is thus possible without difficulty to generate a pair of domes 54 with holes or slots 56 for one left eye 10 and one right eye 10 that are minor images and are symmetrical to an accuracy of, for example, $6/1000$ of an inch (0.15 mm), which is more accurate than an ordinarily skilled taxidermist or sculptor could achieve by traditional methods. The taxidermist or sculptor using the previously marked artificial eyes would then simply set the left eye of each pair in the left eye socket of the mannequin and the right eye in the right socket of the mannequin, and reliably and easily orient them as described above.

Similarly, where eyes 10 are marked by a printing process, etched or engraved plates or other masters may be prepared by a computer controlled process that enables a pair of mirror-image plates to be generated automatically. Alternatively, if, for example, photo-resist etched plates are generated from a film master, a minor-image pair of plates are produced by inverting the film master. Pairs of matching left and right eyes 10 can then be generated by printing equal numbers of eyes 10 from each engraved plate.

In the interests of clarity, each of upper eyelid line 18 and lower eyelid line 20 has been shown in FIG. 1 as a single line. However, the degree of openness of an animal's eyes varies depending on factors including attitude and lighting. Therefore, different degrees of openness, and different positions of the eyelids, are often desired on different occasions. In order to assist the sculptor or taxidermist, multiple upper eyelid lines 18 and lower eyelid 20 are typically provided. However, if multiple identical lines are provided, the taxidermist may accidentally set the left and right eyelids to different eyelid lines 18 and/or 20. To reduce the risk of that error, for example, different upper eyelid lines 18 and lower eyelid lines 20 are marked differently, for example, as solid, dotted, and/or dashed lines. Where the process used for applying indicia to eye 10 permits, different upper eyelid lines 18 and lower eyelid lines 20 are, for example, marked in different colors. Alternatively, or in addition, upper eyelid line(s) 18 and/or lower eyelid line(s) 20 are, for example, marked as broad lines, so that each edge of the broad line functions as a separate eyelid line 18 or 20.

Although a hollow glass eye 10 is described above, the present invention is useful for orienting and placing any form of artificial eye to a mannequin or sculpture. However, when artificial eye 10 is completely opaque, light source 42 may not produce sufficient light to penetrate the artificial eye. Thus, the above-described method may not be precisely applicable, in which case illumination from the front of the eye may be required to see pupil 40 and align the pupil with alignment groove 38.

Moreover, although vertical and horizontal indicia 12, 14 are herein described, any arrangement of indicia that serves the purpose is useful and encompassed by the present invention if they are removably applied and used as described above on the exterior surface of the artificial eye. However, it is presently believed that vertical and horizontal indicia 12, 14, with at least the horizontal indicia centered on the pupil of the artificial eye, provides a particularly easy and accurate means for orienting and aligning mated eyes on a taxidermy mount or sculpture and adding the preferred eyelids in most cases. As a result, a taxidermist using a preferred embodiment of the present invention to position one or more artificial eyes 10 on the mannequin having at least one, and almost always two matching eye socket(s), requires far less time, knowledge of anatomy, or artistic ability to consistently achieve realistic results, as compared with known conventional techniques.

Orienting and matching the paired eyes is no longer a problem because the placement of each eye in accordance with the present invention automatically orients each eye into apparent focus with the other, angles the eye as preferred for each mount and assists in the proper placement of the eyelids with relation to the eyes, the upper lid to the lower lid, and of the two eyes to each other. Consequently, each completed taxidermy project using the present invention is routinely consistent and essentially indistinguishable from a comparable product from a highly skilled and experienced taxidermist using a conventional mannequin, and it economically permits the use of commercially available artificial eyes while still providing a hand-sculpted quality.

The disclosures of each patent, patent application and publication cited or described in this document are hereby incorporated herein by reference, in their entirety.

While the foregoing specification has been described with regard to certain preferred embodiments, and many details have been set forth for the purpose of illustration, it will be apparent to those skilled in the art without departing from the spirit and scope of the invention, that the invention may be subject to various modifications and additional embodiments, and that certain of the details described herein can be varied considerably without departing from the basic principles of the invention. Such modifications and additional embodiments are also intended to fall within the scope of the appended claims and their equivalents.

What is claimed is:

1. A method of installing an artificial eye in a taxidermy form, said method comprising:
providing an artificial eye comprising:
a solid dome member having a life-like pupil and a substantially smooth convex outer surface, said pupil viewable through said substantially smooth convex outer surface; and
at least two of the following forms of visible indicia:
a pupil horizontal axis line removably applied to said substantially smooth convex outer surface such that said pupil horizontal axis line is visible and removable therefrom without damaging said substantially smooth convex outer surface, said pupil horizontal axis line oriented on said substantially smooth convex outer surface such that it appears to extend horizontally through a center of said pupil;
a pupil forward tilt axis line removably applied to said substantially smooth convex outer surface such that said pupil forward tilt axis is visible and removable therefrom without damaging said substantially smooth convex outer surface, said pupil forward tilt axis line oriented on said substantially smooth convex outer surface such that it appears to extend vertically through a center of said pupil or off to one side of said pupil; and
an eye cant line removably applied to said substantially smooth convex outer surface such that said eye cant line is visible and removable therefrom without damaging said substantially smooth convex outer surface, said eye cant line extending substantially diagonally across a corner portion of said solid dome and wherein said method further comprises:
orienting the artificial eye within an eye socket in the taxidermy form using at least two of the following orientation actions:
positioning the artificial eye within the eye socket such that a pupil horizontal axis line is positioned in an orientation relative to a tilt angle of the taxidermy form;
positioning the artificial eye within the eye socket such that the forward tilt axis line is positioned in an orientation relative to a tilt angle of the taxidermy form; and
positioning the artificial eye within the eye socket such that the eye can't line is substantially vertical and wherein said method further comprises:
retaining the artificial eye in a desired orientation after performing the at least two the orientation actions; and
removing at least one of the at least two forms of the visible indicia from the substantially smooth convex outer surface of the artificial eye without damaging the substantially smooth convex outer surface.

2. The method of claim 1 wherein the artificial eye has a depth gauge scale removably applied to the substantially smooth convex outer surface such that the depth gauge scale is visible and removable therefrom without damaging the substantially smooth convex outer surface and wherein said orienting further comprises:
comparing a position of the depth gauge scale to a rim on the eye socket; and
orienting the artificial eye such that the rim of the eye socket aligns with a selected position on the depth gauge scale.

3. The method of claim 1 wherein the artificial eye has at least one eyelid line on said substantially smooth convex outer surface and wherein said method further comprises applying a malleable compound to the artificial eye to form an eyelid having an edge conforming to a corresponding one of the at least one eyelid lines on the artificial eye.

4. The method of claim 1 wherein the artificial eye has a nictating membrane guideline thereon and wherein said method further comprises affixing an artificial nictating membrane to a portion of the substantially smooth convex outer surface in substantial alignment with the nictating membrane guideline.

5. A method of installing an artificial eye in a taxidermy form, said method comprising:
providing an artificial eye comprising:
a solid dome member having a life-like pupil and a substantially smooth convex outer surface, said pupil viewable through said substantially smooth convex outer surface; and
at least one eyelid line on said substantially smooth convex outer surface such that when said solid dome member is attached to the taxidermy form in a final orientation, said at least one eyelid line is oriented to form a guideline for applying eyelid material to said convex outer surface of said solid dome member to form a corresponding life-like eye-lid substantially extending from the form to said eyelid line and wherein said method comprises:
affixing said artificial eye to the form in a desired orientation; and
applying a malleable compound to the artificial eye to form an eyelid having an edge conforming to a corresponding one of the at least one eyelid lines on the artificial eye.

6. The method of claim 5 wherein the artificial eye has a nictating membrane guideline thereon and wherein said method further comprises affixing an artificial nictating membrane to a portion of the substantially smooth convex outer surface in substantial alignment with the nictating membrane guideline.

7. A method of installing an artificial eye in a taxidermy form, said method comprising: providing an artificial eye; comprising: a solid dome member having a life-like pupil and a substantially smooth convex outer surface, said pupil viewable through said substantially smooth convex outer surface; and a pupil horizontal axis line removably applied to said substantially smooth convex outer surface such that said pupil horizontal axis line is visible and removable therefrom without damaging said substantially smooth convex outer surface, said pupil horizontal axis line oriented on said substantially smooth convex outer surface such that it appears to extend horizontally through a center of said pupil to facilitate orientation of the eye within a socket in the taxidermy form in a desired orientation without alignment with a corresponding portion of the taxidermy form and wherein said method further comprises: orienting the artificial eye within an eye socket in the taxidermy form in a desired orientation as indicated by the pupil horizontal axis line on the artificial eye; retaining the artificial eye in the desired orientation; and removing the pupil horizontal axis line from the substantially smooth convex outer surface of the artificial eye without damaging the substantially smooth convex outer surface.

8. The method of claim 7 wherein said orienting comprises positioning the artificial eye within the eye socket such that a pupil horizontal axis line is positioned in an orientation relative to a tilt angle of the taxidermy form.

9. A method of installing an artificial eye in a taxidermy form, said method comprising:
  providing an artificial eye comprising:
    a solid dome member having a life-like pupil and a substantially smooth convex outer surface, said pupil viewable through said substantially smooth convex outer surface; and
    a pupil forward tilt axis line removably applied to said substantially smooth convex outer surface such that said pupil forward tilt axis is visible and removable therefrom without damaging said substantially smooth convex outer surface, said pupil forward tilt axis line oriented on said substantially smooth convex outer surface such that it appears to extend vertically through a center of said pupil or off to one side of said pupil to facilitate orientation of the eye within a socket in the taxidermy form in a desired orientation without alignment with a corresponding portion of the taxidermy form and wherein said method further comprises:
  orienting the artificial eye within an eye socket in the taxidermy form in the desired orientation as indicated by the pupil forward tilt axis line on the artificial eye;
  retaining the artificial eye in the desired orientation; and
  removing the pupil forward tilt axis line from the substantially smooth convex outer surface of the artificial eye without damaging the substantially smooth convex outer surface.

10. A method of installing an artificial eye in a taxidermy form, said method comprising:
  providing an artificial eye comprising:
    a solid dome member having a life-like pupil and a substantially smooth convex outer surface, said pupil viewable through said substantially smooth convex outer surface; and
    an eye cant line removably applied to said substantially smooth convex outer surface such that said eye cant line is visible and removable therefrom without damaging said substantially smooth convex outer surface, said eye cant line extending substantially diagonally across a corner portion of said solid dome to facilitate orientation of the eye within a socket in the taxidermy form in a desired orientation without alignment with a corresponding portion of the taxidermy form and wherein said method further comprises:
  orienting the artificial eye within an eye socket in the taxidermy form in the desired orientation as indicated by the eye cant line on the artificial eye;
  retaining the artificial eye in the desired orientation; and
  removing the eye cant line from the substantially smooth convex outer surface of the artificial eye without damaging the substantially smooth convex outer surface.

* * * * *